United States Patent
Starner et al.

(10) Patent No.: US 9,213,185 B1
(45) Date of Patent: Dec. 15, 2015

(54) DISPLAY SCALING BASED ON MOVEMENT OF A HEAD-MOUNTED DISPLAY

(75) Inventors: Thad Eugene Starner, Mountain View, CA (US); Adrian Wong, Mountain View, CA (US); Yong Zhao, San Jose, CA (US); Chia-Jean Wang, Palo Alto, CA (US); Anurag Gupta, Los Gatos, CA (US); Liang-Yu (Tom) Chi, San Francisco, CA (US)

(73) Assignee: Google Inc., Mountain View, CA (US)

( * ) Notice: Subject to any disclaimer, the term of this patent is extended or adjusted under 35 U.S.C. 154(b) by 355 days.

(21) Appl. No.: 13/466,571

(22) Filed: May 8, 2012

Related U.S. Application Data

(60) Provisional application No. 61/583,972, filed on Jan. 6, 2012.

(51) Int. Cl.
*G06T 19/00* (2011.01)
*G02B 27/01* (2006.01)

(52) U.S. Cl.
CPC ............ *G02B 27/017* (2013.01); *G06T 19/006* (2013.01)

(58) Field of Classification Search
CPC ............... G02B 27/0093; G02B 27/01; G02B 27/0101; G02B 27/0103; G02B 27/0149; G02B 27/017; G02B 27/0172; G02B 27/0176; G02B 27/0179; G02B 27/0189; G02B 2027/01; G02B 2027/0101; G02B 2027/0138; G02B 2027/014; G02B 2027/0149; G02B 2027/0154; G02B 2027/0156; G02B 2027/0159; G02B 2027/017; G02B 2027/0178; G02B 2027/0179; G02B 2027/0187; G06F 3/011–3/013
USPC ............. 345/7–9, 632–633, 682; 359/13, 630
See application file for complete search history.

(56) References Cited

U.S. PATENT DOCUMENTS

| | | | |
|---|---|---|---|
| 6,184,847 B1 * | 2/2001 | Fateh et al. | 345/8 |
| 6,388,638 B2 | 5/2002 | Fukushima et al. | |
| 6,867,753 B2 * | 3/2005 | Chinthammit et al. | 345/8 |
| 7,474,335 B2 | 1/2009 | Basson et al. | |
| 7,965,298 B2 | 6/2011 | Lea et al. | |
| 8,184,070 B1 * | 5/2012 | Taubman | 345/8 |

(Continued)

OTHER PUBLICATIONS

Ruigang Yang, David Gotz, Justin Hensley, Herman Towles, Michael S. Brown, PixelFlex: A Recon˜gurable Multi-Projector Display System, 2001, IEEE Proceedings on Visualization VIS '01, San Diego, CA.*

(Continued)

*Primary Examiner* — Xiao Wu
*Assistant Examiner* — Michael J Cobb
(74) *Attorney, Agent, or Firm* — McDonnell Boehnen Hulbert & Berghoff LLP

(57) ABSTRACT

A wearable computing system may include a head-mounted display (HMD) with a display configured to display images viewable at a viewing location. When aligned with an HMD wearer's line of sight, the entire display area of the display may be within the HMD wearer's field of view. The area within which an HMD wearer's eye can move and still view the entire display area is termed an "eye box." However, if the HMD slips up or down, the display area may become obscured, such that the wearer can no longer see the entire image. By scaling or subsetting an image area within the display area, the effective eye box dimensions may increase. Further, in response to movements of the HMD with respect to the wearer, the image area can be adjusted to reduce effects such as vibration and slippage.

30 Claims, 7 Drawing Sheets

(56) References Cited

U.S. PATENT DOCUMENTS

| | | | |
|---|---|---|---|
| 8,912,979 B1* | 12/2014 | Gomez | 345/8 |
| 8,982,471 B1* | 3/2015 | Starner et al. | 359/630 |
| 2002/0044152 A1* | 4/2002 | Abbott et al. | 345/629 |
| 2005/0168569 A1* | 8/2005 | Igarashi et al. | 348/62 |
| 2006/0152434 A1* | 7/2006 | Sauer et al. | 345/8 |
| 2010/0238161 A1* | 9/2010 | Varga et al. | 345/419 |
| 2010/0281439 A1* | 11/2010 | Markovic et al. | 715/863 |
| 2011/0018903 A1* | 1/2011 | Lapstun et al. | 345/633 |
| 2011/0213664 A1 | 9/2011 | Osterhout et al. | |
| 2011/0273540 A1* | 11/2011 | Lee et al. | 348/51 |
| 2012/0050140 A1* | 3/2012 | Border et al. | 345/8 |
| 2012/0062445 A1* | 3/2012 | Haddick et al. | 345/8 |
| 2012/0068913 A1* | 3/2012 | Bar-Zeev et al. | 345/8 |
| 2012/0075168 A1* | 3/2012 | Osterhout et al. | 345/8 |
| 2012/0094700 A1* | 4/2012 | Karmarkar et al. | 455/466 |
| 2012/0127284 A1* | 5/2012 | Bar-Zeev et al. | 348/53 |
| 2012/0147317 A1* | 6/2012 | Loeb et al. | 351/55 |
| 2012/0188148 A1* | 7/2012 | Dejong | 345/8 |
| 2012/0293548 A1* | 11/2012 | Perez et al. | 345/633 |
| 2013/0007668 A1* | 1/2013 | Liu et al. | 715/841 |
| 2013/0044138 A1* | 2/2013 | Koga | 345/672 |
| 2013/0083003 A1* | 4/2013 | Perez et al. | 345/419 |
| 2013/0088507 A1* | 4/2013 | White | 345/592 |
| 2013/0107371 A1* | 5/2013 | DeVaul | 359/630 |
| 2013/0201094 A1* | 8/2013 | Travis et al. | 345/156 |
| 2015/0212325 A1* | 7/2015 | Choi et al. | 345/156 |

OTHER PUBLICATIONS

Hong Hua, Chunyu Gao, A Systematic Framework for On-line Calibration of a Head-Mounted Projection Display for Augmented-Reality Systems, 2007, Journal of the SID 15(11):905-913.*

Charles B. Owen, Ji Zhou, Arthur Tang, Fan Xiao, Display-Relative Calibration for Optical See-Through Head-Mounted Displays, 2004, Proceedings of the 3rd IEEE and ACM International Symposium on Mixed and Augmented Reality (ISMAR 2004), pp. 70-78, ISBN: 0-7695-2191-6.*

Stuart J. Gilson, Andrew W. Fitzgibbon, and Andrew Glennerster, Spatial Calibration of an Optical See-through Head Mounted Display, 2008, J Neurosci Methods 173(1):140-146.*

Satoshi Handa, Yoshinobu Ebisawa, Development of Head-Mounted Display with Eye-Gaze Detection Function for the Severely Disabled, 2008, IEEE International Conference on Virtual Environments, Human-Computer Interfaces, and Measurement Systems, pp. 140-144, E-ISBN: 978-1-4244-1928-9.*

S. Merhav and M. Velger, Compensating sampling errors in stabilizing helmet-mounted displays using auxiliary acceleration measurements, 1991, Journal of Guidance, Control, and Dynamics, 14(5):1067-1069.*

Ronald T. Azuma, Predictive Tracking for Augmented Reality, 1995, Dissertation, Department of Computer Science, Univeristy of North Carolina at Chapel Hill, Chapel Hill, NC.*

Richard L. Holloway, Registration Error Analysis for Augmented Reality, 1997, Presence: Teleoperators and Virtual Environments 6(4):413-432.*

Fernando Moita, Rúben Oliveira, Victor Santos, Marco Silva, Development of Interfaces for Impaired Users, Jan. 2012, Przegląd Elektrotechniczny, 1a/2012.*

Yasuyoshi Yokokohji, Yoshihiko Sugawara, Tsuneo Yoshikawa, Accurate Image Overlay on Video See-Through HMDs Using Vision and Accelerometers, 2000, Proceedings of the IEEE Virtual Reality 2000 Conference VR'00.*

Seongwon Han, Sungwon Yang, Jihyoung Kim and Mario Gerla, EyeGuardian: A Framework of Eye Tracking and Blink Detection for Mobile Device Users, Feb. 2012, HotMobile '2012, Proceedings of the Twelfth Workshop on Mobile Computing Systems & Applications Article No. 6.*

Andreas Bulling, Daniel Roggen, Gerhard Troster, Its in your eyes: Towards Context-Awareness and Mobile HCI Using Wearable EOG Goggles, 2008, Proceedings of the 10th international conference on ubiquitous computing, pp. 84-93.*

Grant Schindler, Christian Metzger, and Thad Starner, A Wearable Interface for Topological Mapping and Localization in Indoor Environments, 2006, Location- and Context-Awareness Lecture Notes in Computer Science vol. 3987, pp. 64-73.*

* cited by examiner

DISPLAY SCALING BASED ON MOVEMENT OF A HEAD-MOUNTED DISPLAY

CROSS-REFERENCE TO RELATED APPLICATIONS

This application claims priority to U.S. Provisional Patent Application Ser. No. 61/583,972 filed Jan. 6, 2012, the contents of which are hereby incorporated by reference.

BACKGROUND

Wearable systems can integrate various elements, such as miniaturized computers, input devices, sensors, detectors, image displays, wireless communication devices as well as image and audio processors, into a device that can be worn by a user. Such devices provide a mobile and lightweight solution to communicating, computing and interacting with one's environment. With the advance of technologies associated with wearable systems and miniaturized optical elements, it has become possible to consider wearable compact optical displays that augment the wearer's experience of the real world.

By placing an image display element close to the wearer's eye(s), an artificial image can be made to overlay the wearer's view of the real world. Such image display elements are incorporated into systems also referred to as "near-eye displays", "head-mounted displays" (HMDs) or "heads-up displays" (HUDs). Depending upon the size of the display element and the distance to the wearer's eye, the artificial image may fill or nearly fill the wearer's field of view.

SUMMARY

In a first aspect, a wearable computing device is provided. The wearable computing system includes a head-mounted display (HMD) having a display area. At least a portion of the display area is visible from a viewing location. The HMD is configured to display images within an image area of the display area. The image area is smaller than the display area. The wearable computing device further includes an HMD-tracking system. The HMD-tracking system is configured to detect movement of the HMD relative to the viewing location. The wearable computing device further includes a controller for controlling the HMD. The controller is configured to adjust the image area within the display area based on the detected movements so as to to keep the image area visible from the viewing location.

In a second aspect, a method is provided. The method includes displaying images within an image area of a display area of a head-mounted display (HMD). At least a portion of the display area is visible from a viewing location. The image area is smaller than the display area. The method further includes acquiring movement data based on movement of the HMD relative to the viewing location. The method additionally includes adjusting the image area within the display area based on the acquired movement data so as to keep the image area visible from the viewing location.

In a third aspect, a non-transitory computer readable medium is provided. The non-transitory computer readable medium has stored therein instructions executable by a computing device to cause the computing device to perform functions, the functions including causing a head-mounted display (HMD) to display images within an image area of a display area. At least a portion of the display area is visible from a viewing location. The image area is smaller than the display area. The functions further include acquiring movement data based on movement of the HMD relative to the viewing location. The functions additionally include adjusting the image area within the display area based on the acquired movement data so as to keep the image area visible from the viewing location.

DETAILED DESCRIPTION

Figure 1:
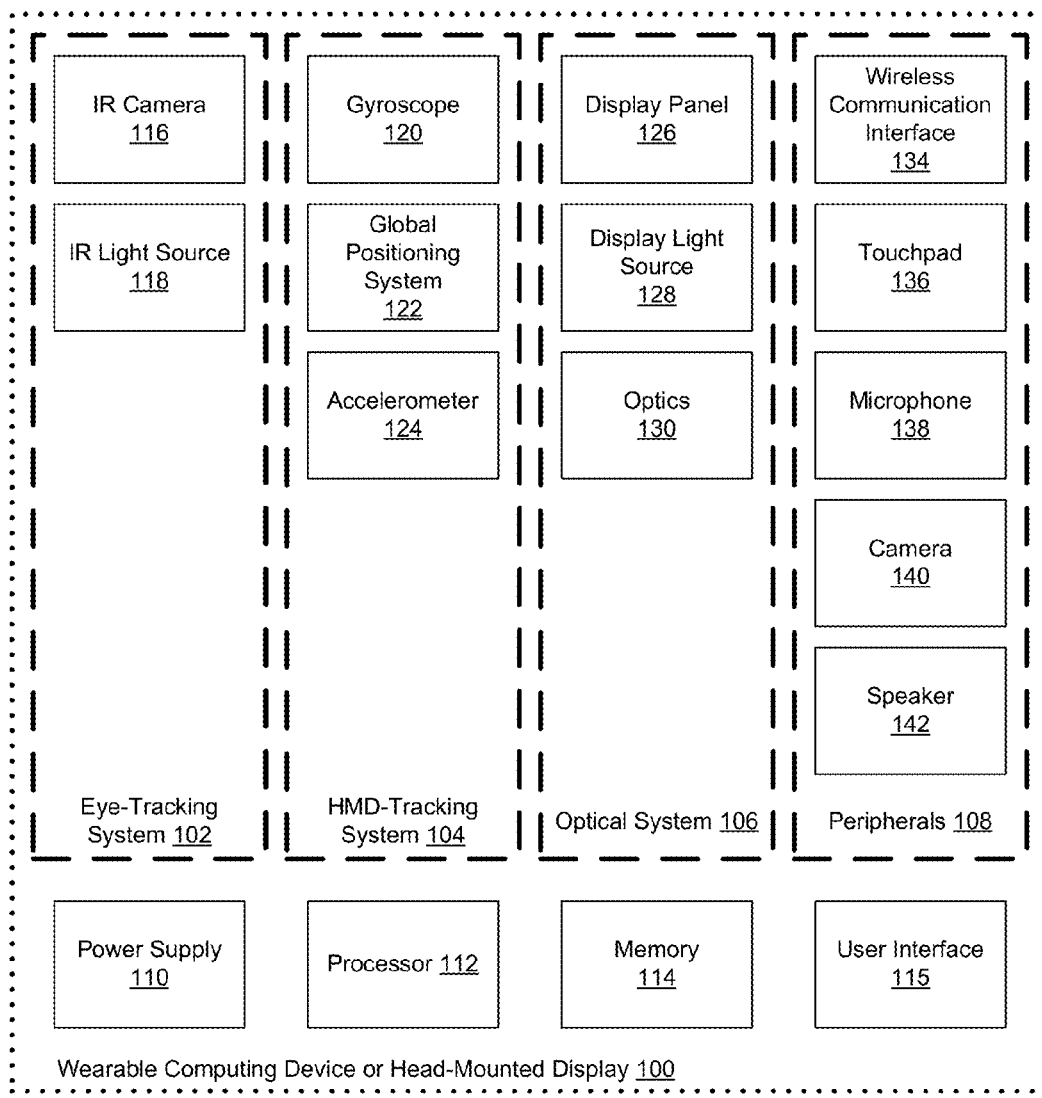
FIG. 1 is a schematic diagram of a wearable computing device, in accordance with an example embodiment.

In the following detailed description, reference is made to the accompanying figures, which form a part thereof. In the figures, similar symbols typically identify similar components, unless context dictates otherwise. The illustrative embodiments described in the detailed description and figures are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

A head-mounted display ("HMD") may enable its wearer to observe the wearer's real-world surroundings and also view a displayed image, such as a computer-generated image or virtual image. In some cases, the displayed image may overlay a portion of the wearer's field of view of the real world. Thus, while the wearer of the HMD is going about his or her daily activities, such as walking, conversing, exercising, etc., the wearer may be able to see a displayed image generated by the HMD at the same time that the wearer is looking out at his or her real-world surroundings.

The displayed image might include, for example, graphics, text, and/or video. The content of the displayed image could relate to any number of contexts, including but not limited to the wearer's current environment, an activity in which the wearer is currently engaged, the biometric status of the wearer, and any audio, video, or textual communications that have been directed to the wearer. The images displayed by the HMD may also be part of an interactive user interface. For example, the HMD could be part of a wearable computing device. Thus, the images displayed by the HMD could include menus, selection boxes, navigation icons, or other user interface features that enable the wearer to invoke functions of the wearable computing device or otherwise interact with the wearable computing device.

The images displayed by the HMD could appear anywhere in the wearer's field of view. For example, the displayed image might occur at or near the center of the wearer's field of view, or the displayed image might be confined to the top, bottom, or a corner of the wearer's field of view. Alternatively, the displayed image might be at the periphery of or entirely outside of the wearer's normal field of view. For example, the displayed image might be positioned such that it is not visible when the wearer looks straight ahead but is visible when the wearer looks in a specific direction, such as up, down, or to one side. In addition, the displayed image might overlay only a small portion of the wearer's field of view, or the displayed image might fill most or all of the wearer's field of view. The displayed image could be displayed continuously or only at certain times (e.g., only when the wearer is engaged in certain activities).

An optical system may be configured to display the images viewable to the HMD wearer. Further, the optical system could be designed with a particular field of view, eye relief distance, and eye box dimension.

The field of view may be defined as a set of angles viewable when the HMD wearer's eye is looking through the optical system from a viewing location. The set of viewable angles is also known in the art as the angular subtense. The field of view may change depending upon the position of the HMD wearer's eye. For example, the field of view may increase if the HMD wearer's eye moves closer to the optical system. Conversely, the field of view may decrease if the HMD wearer's eye moves away from the optical system.

The eye relief distance can be understood as the distance from the eye to the first surface of an optical element, such as a magnifier, in the optical system. A longer eye relief may enable the HMD wearer to position their eyes some distance away from the optical system and still see the full field of view of the display. However, longer eye relief generally increases the diameter of the optics. A typical value for eye relief is 20 mm, but other distances are possible.

The eye box dimensions (or eye box) could be defined as the lateral extents of HMD wearer eye movement that permit full field viewing of the display. In other words, the eye box is the amount of acceptable misalignment possible before at least part of the displayed image becomes occluded (e.g. by the edge of the optics) or becomes otherwise unviewable. The eye box size can be functionally increased in several different ways.

In one example, the eye box dimensions may change if various display optics in the optical system are enlarged. For instance, the magnifying optic could be enlarged to have a larger diameter. Consequently, the eye box dimensions could increase. Increasing eye box dimensions has limitations, however, based at least upon factors such as the size, weight, complexity, and cost of the optical system. These design constraints generally leads to eye box values in the 5 mm to 10 mm range for typical systems.

In another example embodiment, the effective eye box dimensions could also be increased if the image area is smaller than the full display area. For instance, if only the center portion of the display area is used, the effective eye box of the optical system could be enlarged. Thus, image content could be scaled to use less than the full display dimensions to allow a larger eye box. In such a situation, a viewer could view similar information (the image content) from a larger set of positions.

In still another example embodiment, the eye box position could be shifted by adjusting optical elements mechanically or through other means. In other words, by adjusting certain optical elements within the optical system, the eye box position could be adjusted to accommodate the relative movements of an HMD wearer's eye. For instance, a tilting plate could be configured to refract images generated by the HMD towards a magnifying lens. By changing the angle or position of the tilting plate, the refracted light angle and position may change with respect to the magnifying lens. Thus, the tilting plate could be controlled to move the position of the displayed image so as to keep the image in a viewable location for the HMD wearer.

The virtual images generated by the optical system could be displayed based on the position and orientation of the HMD. For example, the HMD may include position and orientation sensors so that when the wearer moves his or her head, data regarding the position and orientation of the HMD can be received by a processor. The HMD may additionally include a display controllable by the processor, so when the wearer moves his or her head, the processor may adjust the displayed image on the display. In particular, the displayed image may move in the opposite direction of head movement to create the sensation of looking around a world with superimposed virtual images.

Further, the position and size of images could be adjusted within the HMD display based upon movements of the HMD. In one embodiment, upon sensing that the HMD is moving, the HMD may act responsively so as to maintain images viewable to the HMD wearer. For example, a person may be jogging while wearing an HMD. The jogging motion may create substantial periodic vertical displacements of the HMD relative to the HMD wearer's eye(s). In some cases, the vertical movement of the HMD could cause at least a portion of the images to be unviewable (e.g. if the eye of the HMD wearer moves outside the eye box). Further, even slight HMD movement with respect to the HMD wearer's eye(s) could increase eye strain and be uncomfortable to the HMD wearer.

An accelerometer and/or gyroscope may detect the relative movements and provide corresponding movement data to a controller that may control the HMD display. In response to the movement data, the controller may control the HMD display to maintain as much viewable area as possible for the HMD wearer. For example, in response to relative HMD movement, the image area (e.g., the extents of the displayed image) could be scaled down to be smaller than the full extents of the display area. Because scaling the image area smaller may cause it to be viewable from a wider set of angles, this may be sufficient to maintain a viewable image due to relative HMD movement. The amount of scaling could be related to the amplitude of relative HMD movement. For instance, if the HMD wearer is jogging, the image area could be subset or scaled by a relatively large amount. Conversely, if the HMD wearer is walking, the image area could be subset or scaled by a relatively smaller amount.

Other adjustments of the image area could also be performed to compensate for relative HMD movement. For instance, when the HMD is vertically displaced upwards (e.g. between jogging footfalls) with respect to the normal wear position, the displayed images could be moved upward on the display so as to allow viewability from a wider set of angles. Further, the displayed images could be adjusted in a dynamic way in response to the accelerometer and/or gyroscope data. For example, in the jogging example, the displayed images could be adjusted up and down in a periodic fashion so as to maintain a stable view for the HMD wearer.

In other embodiments, other sensors could be alternatively or additionally used to detect relative movement of the HMD with respect to the HMD wearer's eyes, for instance. In one embodiment, an eye-tracking system may be used to monitor the relative position of the HMD to the HMD wearer's eye. In the aforementioned jogging scenario, the HMD may be vertically displaced upwards with respect to a normal eye position. The eye tracking system could detect this and provide appropriate information to the HMD controller. In response, the controller may move the virtual image upwards on the display screen to provide an effective eye box substantially centered on the location of the HMD wearer's eye.

Certain illustrative examples of a system and method for adjusting images displayed by an HMD based on movements of the HMD are described below. It is to be understood, however, that other embodiments are possible and are implicitly considered within the context of the following example embodiments.

2. A Wearable Computing Device with Subsetting Eyebox in an HMD Based on HMD Movement FIG. 1 is a schematic diagram of a wearable computing device or a head-mounted display (HMD) 100 that may include several different components and subsystems. As shown, the HMD 100 includes an eye-tracking system 102, an HMD-tracking system 104, an optical system 106, peripherals 108, a power supply 110, a processor 112, a memory 114, and a user interface 115. The eye-tracking system 102 may include hardware such as an infrared camera 116 and at least one infrared light source 118. The HMD-tracking system 104 may include a gyroscope 120, a global positioning system (GPS) 122, and an accelerometer 124. The optical system 106 may include, in one embodiment, a display panel 126, a display light source 128, and optics 130. The peripherals 108 may include a wireless communication interface 134, a touchpad 136, a microphone 138, a camera 140, and a speaker 142.

In an example embodiment, HMD 100 includes a see-through display. Thus, the wearer of HMD 100 may observe a portion of the real-world environment, i.e., in a particular field of view provided by the optical system 106. In the example embodiment, HMD 100 is operable to display virtual images that are superimposed on the field of view, for example, to provide an "augmented reality" experience. Some of the virtual images displayed by HMD 100 may be superimposed over particular objects in the field of view. HMD 100 may also display images that appear to hover within the field of view instead of being associated with particular objects in the field of view.

Components of the HMD 100 may be configured to work in an interconnected fashion with other components within or outside their respective systems. For instance, in an example embodiment, the infrared camera 116 may image one or both of the HMD wearer's eyes. The infrared camera 116 may deliver image information to the processor 112, which may access the memory 114 and make a determination regarding the position of the HMD wearer's eye or eyes. The processor 112 may also receive input from the gyroscope 120, and/or the accelerometer 124 to determine similar HMD-to-eye relative position data. Subsequently, the processor 112 may control the user interface 115 and the display panel 126 to display virtual images to the HMD wearer that may be adjusted to compensate for displacements away from a normal viewing position.

HMD 100 could be configured as, for example, eyeglasses, goggles, a helmet, a hat, a visor, a headband, or in some other form that can be supported on or from the wearer's head. Further, HMD 100 may be configured to display images to both of the wearer's eyes, for example, using two see-through displays. Alternatively, HMD 100 may include only a single see-through display and may display images to only one of the wearer's eyes, either the left eye or the right eye.

The HMD 100 may also represent an opaque display configured to display images to one or both of the wearer's eyes without a view of the real-world environment. For instance, an opaque display or displays could provide images to both of the wearer's eyes such that the wearer could experience a virtual reality version of the real world. Alternatively, the HMD wearer may experience an abstract virtual reality environment that could be substantially or completely detached from the real world. Further, the HMD 100 could provide an opaque display for a first eye of the wearer as well as provide a view of the real-world environment for a second eye of the wearer.

A power supply 110 may provide power to various HMD components and could represent, for example, a rechargeable lithium-ion battery. Various other power supply materials and types known in the art are possible.

The functioning of the HMD 100 may be controlled by a processor 112 that executes instructions stored in a non-transitory computer readable medium, such as the memory 114. Thus, the processor 112 in combination with instructions stored in the memory 114 may function as a controller of HMD 100. As such, the processor 112 may control the user interface 115 to adjust the images displayed by HMD 100. The processor 112 may also control the wireless communication interface 134 and various other components of the HMD 100. The processor 112 may additionally represent a plurality of computing devices that may serve to control individual components or subsystems of the HMD 100 in a distributed fashion.

In addition to instructions that may be executed by the processor 112, the memory 114 may store data that may include a set of calibrated wearer eye pupil positions and a collection of past eye pupil positions. Thus, the memory 114 may function as a database of information related to gaze direction and/or HMD wearer eye location. Such information may be used by HMD 100 to anticipate where the wearer will look and determine what images are to be displayed to the wearer. Within the context of the invention, eye pupil positions could also be recorded relating to a 'normal' or a 'calibrated' viewing position. Eye box adjustment could occur if the eye pupil is detected to be at a location other than these viewing positions.

In addition, information may be stored in the memory 114 regarding possible control instructions that may be enacted using eye movements. For instance, two consecutive wearer eye blinks may represent a control instruction directing the HMD 100 to capture an image using camera 140. Another possible embodiment may include a configuration such that specific eye movements may represent a control instruction. For example, an HMD wearer may lock or unlock the user interface 115 with a series of predetermined eye movements.

Control instructions could be based on dwell-based selection of a target object. For instance, if a wearer fixates visually upon a particular virtual image or real-world object for longer than a predetermined time period, a control instruction may be generated to select the virtual image or real-world object as a target object. Many other control instructions are possible.

The HMD 100 may include a user interface 115 for providing information to the wearer or receiving input from the wearer. The user interface 115 could be associated with, for example, the displayed virtual images and/or one or more input devices in peripherals 108, such as touchpad 136 or microphone 138. The processor 112 may control the functioning of the HMD 100 based on inputs received through the user interface 115. For example, the processor 112 may utilize user input from the user interface 115 to control how the HMD 100 displays images within a field of view or to determine what images the HMD 100 displays.

An eye-tracking system 102 may be included in the HMD 100. In an example embodiment, an eye-tracking system 102 may deliver information to the processor 112 regarding the eye position of a wearer of the HMD 100. The eye-tracking data could be used, for instance, to determine a direction in which the HMD wearer may be gazing. The processor 112 could determine target objects among the displayed images based on information from the eye-tracking system 102. The processor 112 may control the user interface 115 and the display panel 126 to adjust the target object and/or other displayed images in various ways. For instance, an HMD wearer could interact with a mobile-type menu-driven user interface using eye gaze movements.

The infrared camera 116 may be utilized by the eye-tracking system 102 to capture images of a viewing location associated with the HMD 100. Thus, the infrared camera 116 may image the eye of an HMD wearer that may be located at the viewing location. The images could be either video images or still images. The images obtained by the infrared camera 116 regarding the HMD wearer's eye may help determine where the wearer is looking within the HMD field of view, for instance by allowing the processor 112 to ascertain the location of the HMD wearer's eye pupil. Analysis of the images obtained by the infrared camera 116 could be performed by the processor 112 in conjunction with the memory 114 to determine, for example, a gaze direction.

The imaging of the viewing location could occur continuously or at discrete times depending upon, for instance, HMD wearer interactions with the user interface 115 and/or the state of the infrared light source 118 which may serve to illuminate the viewing location. The infrared camera 116 could be integrated into the optical system 106 or mounted on the HMD 100. Alternatively, the infrared camera could be positioned apart from the HMD 100 altogether. Furthermore, the infrared camera 116 could additionally represent a conventional visible light camera with sensing capabilities in the infrared wavelengths.

The infrared light source 118 could represent one or more infrared light-emitting diodes (LEDs) or infrared laser diodes that may illuminate a viewing location. One or both eyes of a wearer of the HMD 100 may be illuminated by the infrared light source 118.

The eye-tracking system 102 could be configured to acquire images of glint reflections from the outer surface of the cornea, which are also called first Purkinje images. Alternatively, the eye-tracking system 102 could be configured to acquire images of reflections from the inner, posterior surface of the lens, which are termed fourth Purkinje images. In yet another embodiment, the eye-tracking system 102 could be configured to acquire images of the eye pupil with so-called bright and/or dark pupil images. In practice, a combination of these glint and pupil imaging techniques may be used for rotational eye tracking, accuracy, and redundancy. Other imaging and tracking methods are possible.

The HMD-tracking system 104 could be configured to provide an HMD position and an HMD orientation to the processor 112.

The gyroscope 120 could be a microelectromechanical system (MEMS) gyroscope, a fiber optic gyroscope, or another type of gyroscope known in the art. The gyroscope 120 may be configured to provide orientation information to the processor 112. The GPS unit 122 could be a receiver that obtains clock and other signals from GPS satellites and may be configured to provide real-time location information to the processor 112. The HMD-tracking system 104 could further include an accelerometer 124 configured to provide motion input data to the processor 112.

The optical system 106 could include components configured to provide virtual images at a viewing location. The viewing location may correspond to the location of one or both eyes of a wearer of an HMD 100. The components of the optical system 106 could include a display panel 126, a display light source 128, and optics 130. These components may be optically and/or electrically-coupled to one another and may be configured to provide viewable images at a viewing location. As mentioned above, one or two optical systems 106 could be provided in an HMD apparatus. In other words, the HMD wearer could view virtual images in one or both eyes, as provided by one or more optical systems 106. Also, as described above, the optical system(s) 106 could include an opaque display and/or a see-through display, which may allow a view of the real-world environment while providing superimposed virtual images.

Various peripheral devices 108 may be included in the HMD 100 and may serve to provide information to and from a wearer of the HMD 100. In one example, the HMD 100 may include a wireless communication interface 134 for wirelessly communicating with one or more devices directly or via a communication network. For example, wireless communication interface 134 could use 3G cellular communication, such as CDMA, EVDO, GSM/GPRS, or 4G cellular communication, such as WiMAX or LTE. Alternatively, wireless communication interface 134 could communicate with a wireless local area network (WLAN), for example, using WiFi. In some embodiments, wireless communication interface 134 could communicate directly with a device, for example, using an infrared link, Bluetooth, or ZigBee. The wireless communication interface 134 could interact with devices that may include, for example, components of the HMD 100 and/or externally-located devices.

Although FIG. 1 shows various components of the HMD 100 (i.e., wireless communication interface 134, processor 112, memory 114, infrared camera 116, display panel 126, GPS 122, and user interface 115) as being integrated into HMD 100, one or more of these components could be physically separate from HMD 100. For example, the infrared camera 116 could be mounted on the wearer separate from HMD 100. Thus, the HMD 100 could be part of a wearable computing device in the form of separate devices that can be worn on or carried by the wearer. The separate components that make up the wearable computing device could be communicatively coupled together in either a wired or wireless fashion.

Figure 2A:
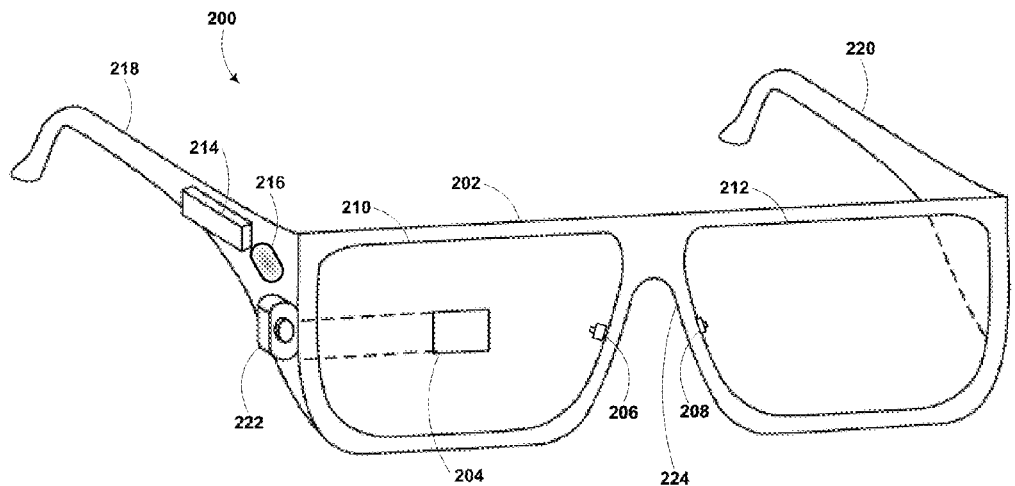
FIG. 2A is a perspective view of a head-mounted display, in accordance with an example embodiment.
Figure 2B:
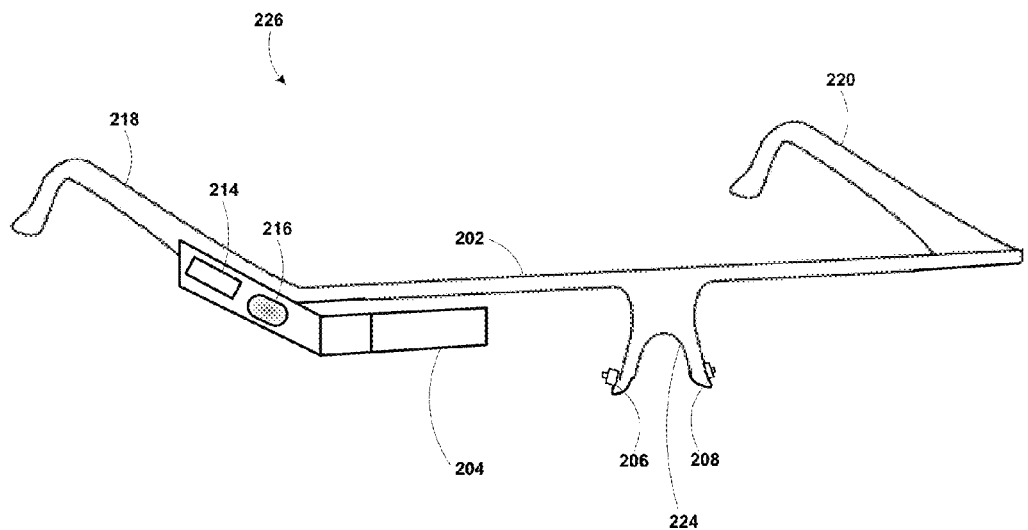
FIG. 2B is a perspective view of a head-mounted display, in accordance with an example embodiment.
Figure 2C:
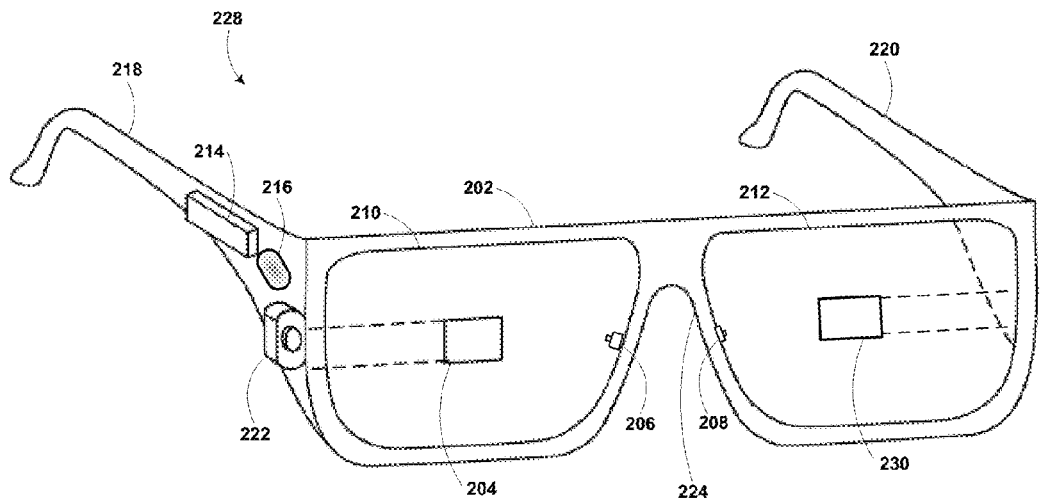
FIG. 2C is a perspective view of a head-mounted display, in accordance with an example embodiment.

FIGS. 2A, 2B, and 2C illustrate example head-mounted displays that have an eyeglasses format. As illustrated in FIG. 2A, the HMD 200 has a frame 202 that could include nosepiece 224 and earpieces 218 and 220. The frame 202, nosepiece 224, and earpieces 218 and 220 could be configured to secure the HMD 200 to a wearer's face via a wearer's nose and ears. Each of the frame elements, 202, 224, 218, and 220 may be formed of a solid structure of plastic and/or metal, or may be formed of a hollow structure of similar material so as to allow wiring and component interconnects to be internally routed through the HMD 200. Other materials may be possible as well.

The earpieces 218 and 220 could be attached to projections that extend away from the lens frame 202 and could be positioned behind a wearer's ears to secure the HMD 200 to the wearer. The projections could further secure the HMD 200 to the wearer by extending around a rear portion of the wearer's head. Additionally or alternatively, for example, the HMD 200 could connect to or be affixed within a head-mounted helmet structure. Other possibilities exist as well.

Lens elements 210 and 212 could be mounted in frame 202. The lens elements 210 and 212 could be formed of any material that can suitably display a projected image or graphic. Each of the lens elements 210 and 212 could be sufficiently transparent to allow a wearer to see through the lens element. Combining these two features of the lens elements may facilitate an augmented reality or a heads-up display where the projected image or graphic is superimposed over a real-world view as perceived by the wearer through lens elements 210 and 212.

The HMD 200 may include a computer 214, a touch pad 216, a camera 222, and a display 204. The computer 214 is shown to be positioned on the extending side arm of the HMD 200; however, the computer 214 may be provided on other parts of the HMD 200 or may be positioned remote from the HMD 200 (e.g., the computer 214 could be wire- or wirelessly-connected to the HMD 200). The computer 214 could include a processor and memory, for example. The computer 214 may be configured to receive and analyze data from the camera 222 and the touch pad 216 (and possibly from other sensory devices, user-interfaces, or both) and generate images for output by the lens elements 210 and 212.

A camera 222 could be positioned on an extending side arm of the HMD 200, however, the camera 222 may be provided on other parts of the HMD 200. The camera 222 may be configured to capture images at various resolutions or at different frame rates. The camera 222 could be configured as a video camera and/or as a still camera. A camera with small form factor, such as those used in cell phones or webcams, for example, may be incorporated into an example embodiment of HMD 200.

Further, although FIG. 2A illustrates one camera 222, more cameras could be used, and each may be configured to capture the same view, or to capture different views. For example camera 222 may be forward facing to capture at least a portion of the real-world view perceived by the wearer. This forward facing image captured by the camera 222 may then be used to generate an augmented reality where computer generated images appear to interact with the real world view perceived by the wearer.

Other sensors could be incorporated into HMD 200. Other sensors may include one or more of a gyroscope or an accelerometer, for example. Other sensing devices may be included in HMD 200.

The touch pad 216 is shown on an extending side arm of the HMD 200. However, the touch pad 216 may be positioned on other parts of the HMD 200. Also, more than one touch pad may be present on the HMD 200. The touch pad 216 may be used by an HMD wearer to input commands. The touch pad 216 may sense at least one of a position and a movement of a finger via capacitive sensing, resistance sensing, or a surface acoustic wave process, among other possibilities. The touch pad 216 may be capable of sensing finger movement in a direction parallel or planar to the pad surface, in a direction normal to the pad surface, or both, and may also be capable of sensing a level of pressure applied to the pad surface. The touch pad 216 may be formed of one or more translucent or transparent insulating layers and one or more translucent or transparent conducting layers. Edges of the touch pad 216 may be formed to have a raised, indented, or roughened surface, so as to provide tactile feedback to an HMD wearer when the wearer's finger reaches the edge, or other area, of the touch pad 216. If more than one touch pad is present, each touch pad may be operated independently, and may provide a different function.

Additionally, the HMD 200 may include eye-tracking systems 206 and 208, which may be configured to track the eye position of each eye of the HMD wearer. The eye-tracking systems 206 and 208 may each include one or more infrared light sources and one or more infrared cameras. Each of the eye-tracking systems 206 and 208 could be configured to image one or both of the HMD wearer's eyes. Although two eye-tracking systems are depicted in FIG. 2A, other embodiments are possible. For instance, one eye-tracking system could be used to track both eyes of an HMD wearer.

Display 204 could represent, for instance, an at least partially reflective surface upon which images could be projected using a projector. The lens elements 210 and 212 could act as a combiner in a light projection system and may include a coating that reflects the light projected onto them from projectors. In some embodiments, a reflective coating may be omitted (e.g., when the projectors are scanning laser devices). The images could be thus viewable to an HMD wearer.

Although the display 204 is depicted as presented to the right eye of the HMD wearer, other example embodiments could include a display for both eyes or a single display viewable by both eyes.

In alternative embodiments, other types of display elements may be used. For example, the lens elements 210 and 212 could themselves include: a transparent or semi-transparent matrix display, such as an electroluminescent display or a liquid crystal display, one or more waveguides for delivering an image to the HMD wearer's eyes, or other optical elements capable of delivering an in focus near-to-eye image to the wearer. A corresponding display driver may be disposed within the frame 202 for driving such a matrix display. Alternatively or additionally, a laser or light-emitting diode (LED) source and scanning system could be used to draw a raster display directly onto the retina of one or more of the wearer's eyes. Other possibilities exist as well.

In FIG. 2B, an HMD 226 with a monocle design is illustrated. The HMD frame 202 could include nosepiece 224 and earpieces 218 and 220. The HMD 226 may include a single display 204 that may be coupled to one of the side arms or the nose piece 224. In one example, the single display 204 could be coupled to the inner side (i.e. the side exposed to a portion of an HMD wearer's head when worn by the wearer) of the extending side arm of frame 202. The display 204 could be positioned in front of or proximate to a wearer's eye when the HMD 200 is worn by a wearer. The display 204 could be configured to overlay computer-generated graphics upon the wearer's view of the physical world.

As in the aforementioned embodiments, eye-tracking systems 206 and 208 could be mounted on nosepiece 224. The eye-tracking systems 206 and 208 could be configured to track the eye position of both eyes of an HMD wearer. The HMD 226 could include a computer 214, touchpad 216, and a display 204 for one eye of the wearer.

FIG. 2C illustrates an HMD 228 with a binocular design. In such an embodiment, separate displays could be provided for each eye of an HMD wearer. For example, displays 204 and 230 could be provided to the right and left eye of the HMD wearer, respectively. Alternatively, a single display could provide images to both eyes of the HMD wearer. The images provided to each eye may be different or identical to one another. Further, the images could be provided to each eye in an effort to create a stereoscopic illusion of depth.

Figure 3A:
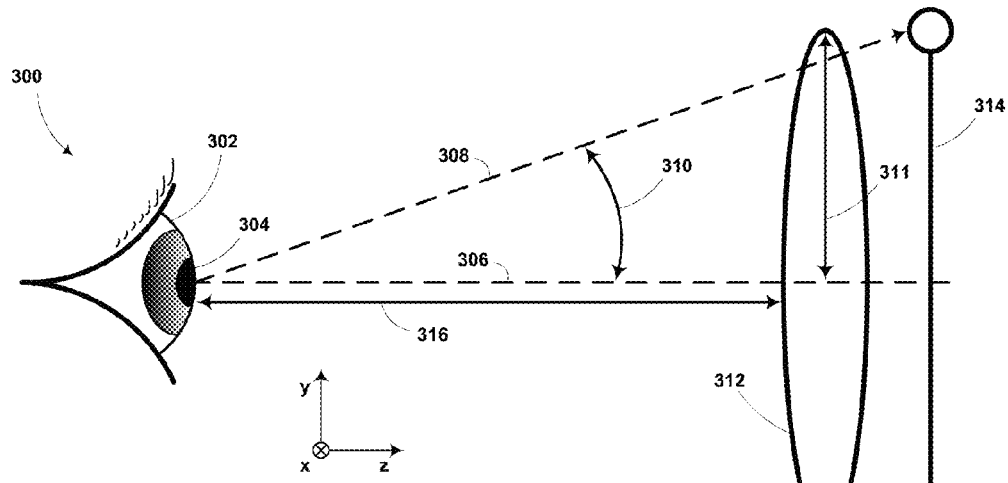
FIG. 3A is a side view of viewer viewing an object, in accordance with an example embodiment.

FIG. 3A is a side view of viewer viewing an object. In scenario 300, an eye 302 and a pupil 304 of an HMD wearer could be viewing an image 314 through an optical element 312 with a diameter 311. When the eye 302 of the HMD wearer is located at a given viewing distance 316 from the optical element 312, the HMD wearer may be able to see the entire image 314. The field of view in the vertical direction could be defined by normal axis 306 and a top axis 308 that converge at the HMD wearer's pupil 304 with a half angle 310. Movements of the HMD wearer's eye 302 (e.g., relative upward or downward movement) could lead to occlusion or obscuration of the image 314. Thus, some or all of image 314 could be unviewable if the eye 302 moves away from the as-illustrated position.

Figure 3B:
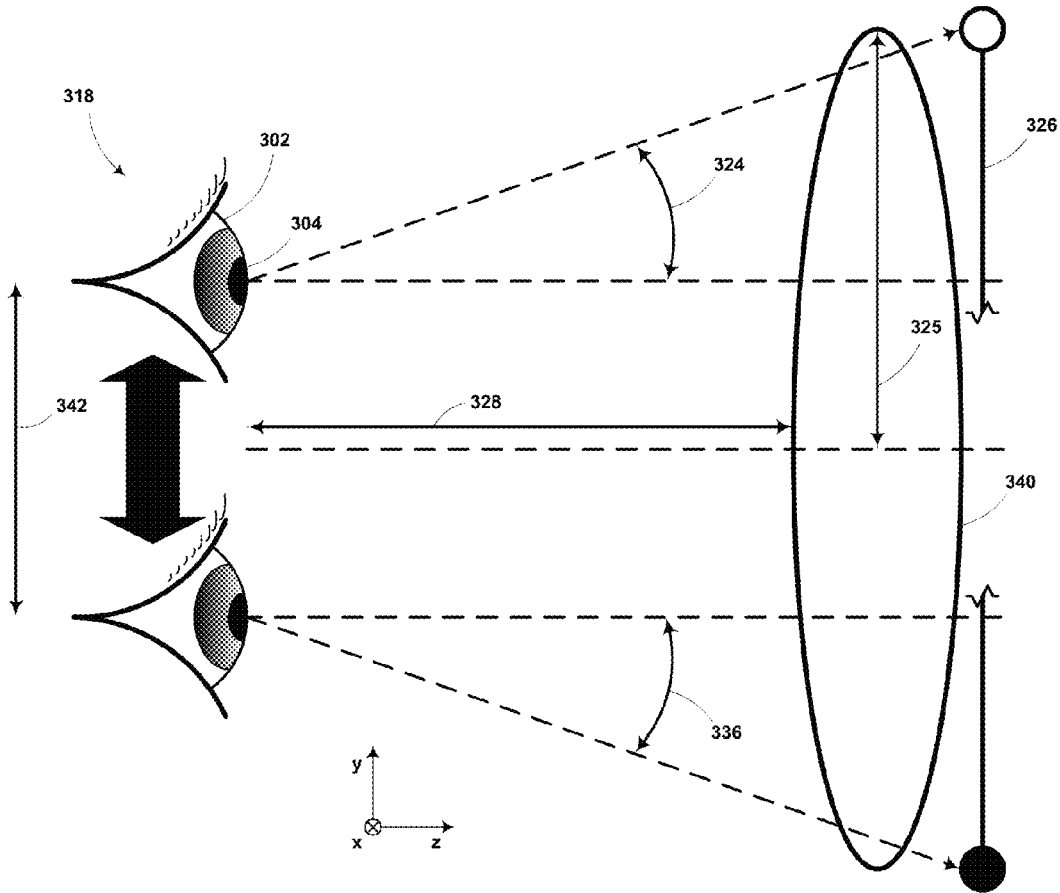
FIG. 3B is a side view of a viewer viewing an object from different positions, in accordance with an example embodiment.

FIG. 3B is a side view of a viewer viewing an object from different positions. In scenario 318, the optical element 340 could have a diameter 325 that is larger than that in FIG. 3A. While viewing an image 326, which could be identical in other respects to that in FIG. 3A, the HMD wearer may be able to view image 326 from a wider range of positions without occluding or obscuring the image 326. Accordingly, the optical constraints of the display eye box could be relaxed for a given viewing distance 328 between the HMD wearer's eye 302 and the optical element 340. For example, the HMD wearer's field of view could be larger than the sum of the half-angles 324 and 336. Thus, the HMD wearer's eye could move vertically some distance 342, which could relate to the vertical eye box dimension.

Figure 3C:
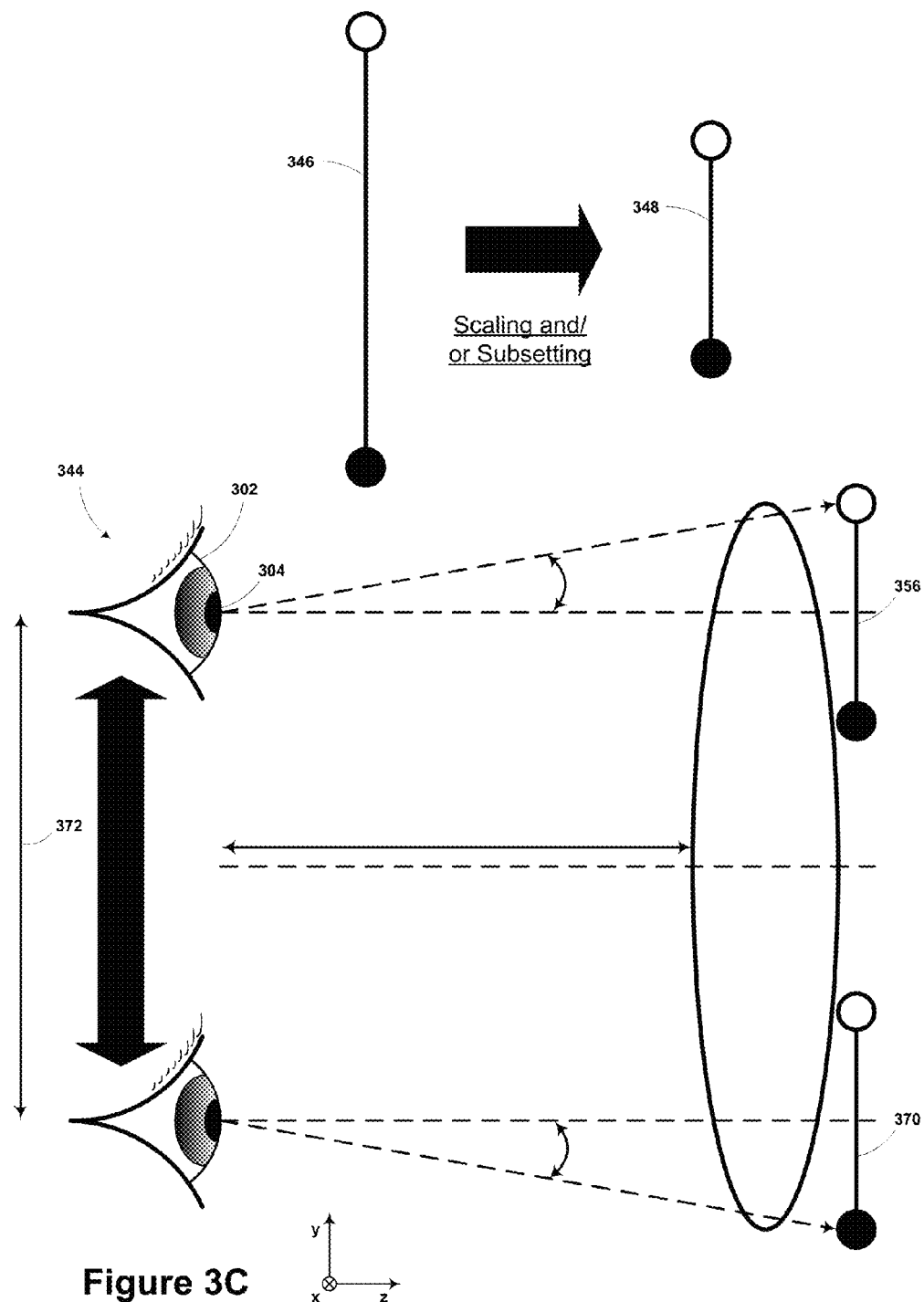
FIG. 3C is a side view of a viewer viewing a smaller object from different positions, in accordance with an example embodiment.

In a related scenario 344, FIG. 3C is a side view of a viewer viewing a smaller object from different positions. In one embodiment, an image 346, which may be configured for display with the same size and/or scale as corresponding images from FIGS. 3A (314) and 3B (326). By reducing the size and/or scale of the image 346, a scaled image 348 can be 'subset' as having an image area that does not include the full display area. In this way, it could be possible for the HMD wearer to experience an eye box with expanded dimensions. For instance, by using a scaled image 348, the HMD wearer may be able to move his/her eye position within a vertical displacement range 372 without occluding or obscuring displayed image. Further, by moving the scaled image 356 (at a top vertical displacement) or scaled image 370 (at a bottom vertical displacement) within the display area, effective eye box dimensions could be further enlarged. Adjustment of image within the display area could be done with graphics software/hardware, mechanical means (e.g., adjusting the angle/position of a tilting plate or mirror), and/or optical means (e.g., adjusting the local refractive index of a beam-splitter coating).

Figure 4A:
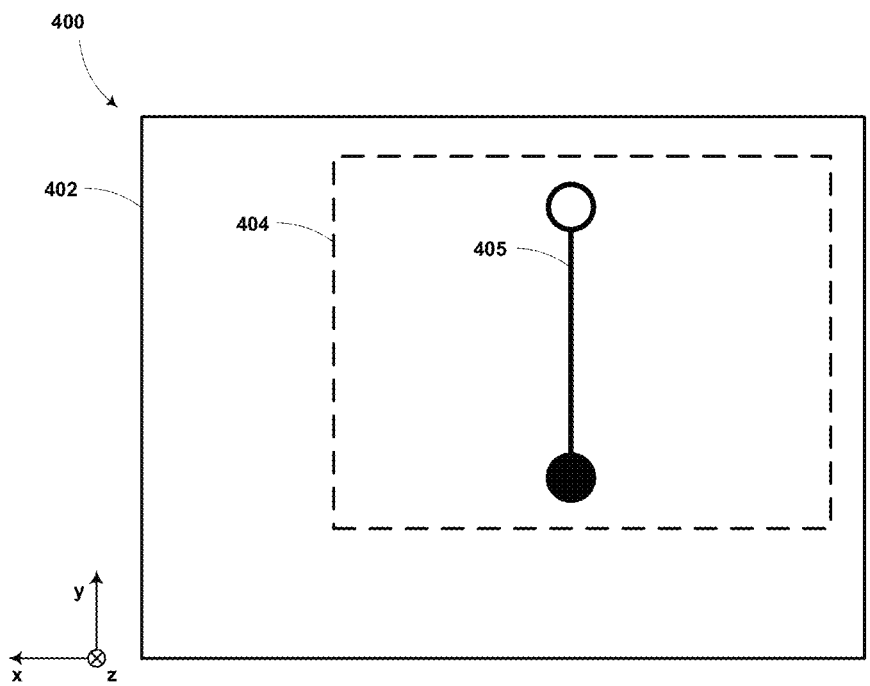
FIG. 4A is a subset image area within a display area, in accordance with an example embodiment.

FIG. 4A includes an example embodiment with a subset image area within a display area. In this scenario 400, an image area 404 could be subset within a larger display area 402 and could be viewable to an HMD wearer as shown. The image area 404 may include a scaled image 405 and may also be adjustable within the display area 402 based on absolute and/or relative movement of the HMD. In some embodiments, the scaled image 405 could be reduced in size and/or scale using optical or mechanical means. The adjustment of image area 404 may serve to provide a larger effective eye box to an HMD wearer.

Figure 4B:
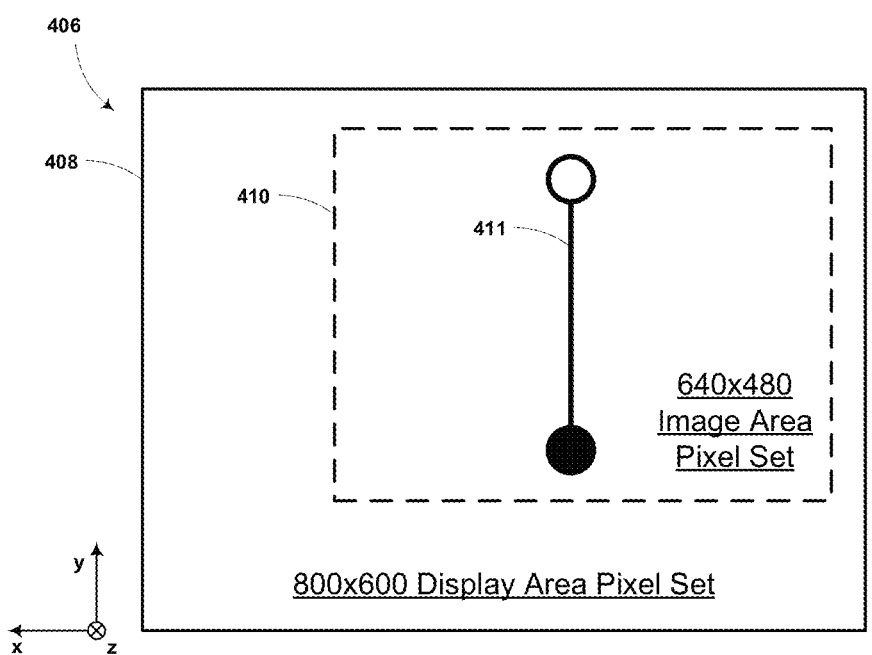
FIG. 4B is a subset image area pixel set within a display area pixel set, in accordance with an example embodiment.

FIG. 4B includes a subset image area pixel set within a display area pixel set. In scenario 406, an image area pixel set 410 could have pixel extents of 640×480. The image area pixel set 410 could include a scaled image 411. The scaled image 411 could be reduced in size and/or scale using methods known in vector graphics and other graphical output arts. The larger display area pixel set 408 could have pixel extents of 800×600. Other extents of image area pixel sets and display area pixel sets (e.g., image and display resolutions) are possible. The image area pixel set 410 could be adjusted within the display area pixel set 408 using, for instance, video graphics hardware and related software. In some embodiments, the image area pixel set 410 could be adjusted in response to an absolute or relative HMD movement, such as when the HMD wearer is walking or jogging.

3. A Method for a Subsetting Eyebox in an HMD Based on HMD Movement

Figure 5:
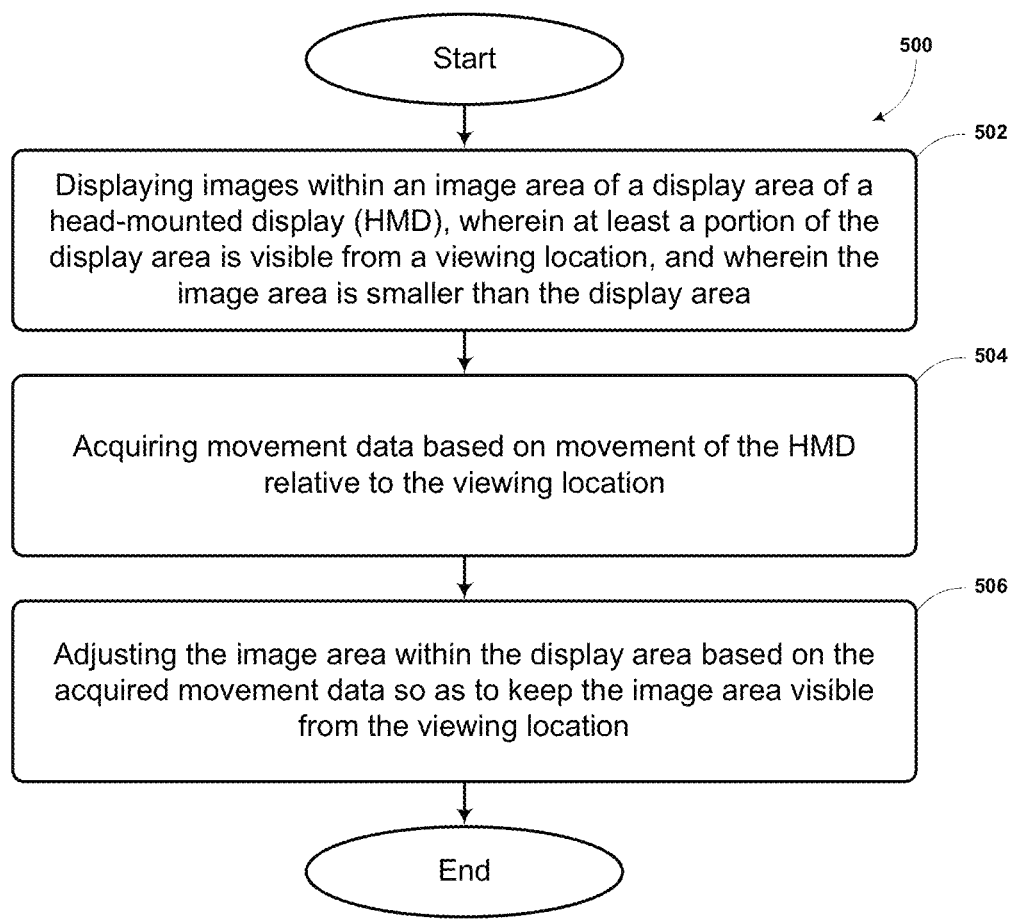
FIG. 5 is a flowchart of a method, in accordance with an example embodiment.

A method 500 is provided for adjusting an image area of a display area based on movements of the head-mounted display (HMD) relative to a viewing location. The method could be performed using an apparatus shown in FIGS. 1-4B and described above, however, other configurations could be used. FIG. 5 illustrates the steps in an example method, however, it is understood that in other embodiments, the steps may appear in different order and steps may be added or subtracted.

Step 502 includes displaying images within an image area of a display area of an HMD. At least a portion of the display area is visible from the viewing location, which could be one or both eyes of the HMD wearer. The image area could be smaller than the display area, for instance if subset within the display. Displaying the images could be done with a display panel optically coupled to the display area.

Step 504 includes acquiring movement data based on movement of the HMD relative to the viewing location. In some embodiments, such movement data could be generated by a sensor configured to measure movement of the HMD. Sensors may include accelerometers, gyroscopes, and/or a proximity sensor (e.g., to determine the distance of the HMD from the wearer's eye or other feature). Other sensors known in the art are possible.

In other embodiments, an eye-tracking system could image the HMD wearer's eye(s) at least in order to determine the position of a reference point on the HMD wearer, such as an eye pupil or a corner of an eye. Movement data provided by the eye-tracking system could include displacements away from a standard position. A standard position may include a position of the HMD relative to the HMD wearer such that the HMD wearer's eye is located within the eye box of the HMD. Accordingly, the eye-tracking system may provide movement data based on HMD movement in relation to the standard position.

Step 506 includes adjusting the image area within the display area based on the acquired movement data. The image area of the display may be adjusted such that the image area remains visible from the viewing location. The adjustment of the image area could be performed using several different methods.

For instance, in an example embodiment, software could be used to scale an image to dimensions smaller than the full display area of the HMD display. Vector graphics could be implemented using standards such as Scalable Vector Graphics (SVG), or Scalable Vector Graphics Tiny version (SVGT). Vector graphics allow independence from the resolution of the display. Using vector-to-raster conversion, the vector graphic can be rendered with a raster format that could be identical to the full resolution of the display. Alternatively, the vector graphic could be rendered at a smaller resolution than the full resolution of the display in order to 'subset' the image. Other methods known in the art to scale images to various sizes and resolutions may be used.

In an example embodiment, the vector graphics could be scaled down to a raster format smaller than the full resolution of the display. With unused display area in at least one dimension of the display, the images could be adjusted in response to HMD movement. Such HMD movement could be absolute (e.g., the HMD moves upwards) or relative (e.g., the HMD moves upwards with respect to the HMD wearer). Image adjustments could include adjusting the image area within the display area based on the amplitude and direction of the absolute and/or relative HMD movements.

Image adjustments could also be performed with various optical and mechanical means. In an example embodiment, the refractive index of a liquid crystal lens in an optical path between a display panel and the HMD wearer's eye could be adjusted in response to HMD movement. In another embodiment, an angle of a tilting plate in the optical path could be adjusted in response to the HMD movement.

Further, such methods could apply to both 2-D and 3-D imagery. For instance, stereoscopic 3-D images could also be subset and adjusted in similar ways as described in the above method and apparatus. Adjustments could also be performed in two displays, wherein a first display and a second display may be configured to display an image to a first eye and a second eye of the HMD wearer, respectively, such as in a binocular HMD.

Example methods may be described herein as being implemented by an HMD. However, it should be understood that other example methods may be implemented in whole or in part by other types of computing devices. For example, an example method may be implemented in whole or in part by a server system, which receives data from a device such as an HMD. As additional examples, an example method may be implemented in whole or in part by computing devices such as a mobile phone, a tablet computer, and/or a laptop or desktop computer. Other examples of computing devices or combinations of computing devices that can implement an example method are possible.

4. A Non-Transitory Computer Readable Medium for a Subsetting Eyebox in an HMD Based on HMD Movement Some or all of the functions described above and illustrated in FIGS. 3A, 3B, 3C, 4A, 4B, and 5 may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be a wearable computing device, such as the wearable computing device 100 illustrated in FIG. 1. Alternatively, the computing device that executes the stored instructions could be another computing device, such as a server in a server network.

The non-transitory computer readable medium may store instructions executable by the processor 112 to perform various functions. For instance, the processor 112 could be instructed to cause a head-mounted display (HMD) to display images within an image area of a display area. The HMD could be similar to the aforementioned example embodiments; however, other embodiments are possible. The display area may be optically coupled to a display panel, which could be configured to generate images. An image area could include at least a portion of the display area and at least a portion of the display area could be visible from a viewing location. The viewing location could include one or both of the HMD wearer's eye(s).

The functions further include acquiring movement data based on the movement of the HMD relative to the viewing location. In one embodiment, the processor 112 and a memory 114 could receive movement data from sensors associated with the HMD. The movement data could include information regarding the displacement, acceleration, velocity, and/or orientation of the HMD. Other examples of movement data are possible.

The functions also include, in response to the movement data, adjusting the image area within the display area so as to keep the image area viewable from the viewing location. For example, the processor 112 could adjust the image area directly by controlling the display panel to subset or scale the image area with respect to the display area. Alternatively or additionally, the processor 112 could adjust an optical element such as an adjustable mirror or a tilting plate to move and/or scale the image area within the display area.

CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A wearable computing device, comprising:
a head-mounted display (HMD) having a display area, wherein the HMD is configured to display images within an image area of the display area, and wherein all of the image area is visible through an optical element of the HMD by an eye of a wearer of the HMD when the eye of the wearer is located within a first range of viewing locations;
an HMD-tracking system that is configured to detect movement of the HMD relative to the eye of the wearer; and
a controller for controlling the HMD, wherein the controller is configured to adjust the image area within the display area based on the detected movement so as to increase a range of viewing locations from which the image area is visible through the optical element by the eye of the wearer to a second range of viewing locations that (i) is larger than the first range of viewing locations and (ii) includes the first range of viewing locations.

2. The wearable computing device of claim 1, wherein the display area is optically coupled to a light-emitting diode (LED) display.

3. The wearable computing device of claim 1, wherein the display area is optically coupled to a liquid crystal on silicon (LCOS) display.

4. The wearable computing device of claim 1, wherein the HMD-tracking system comprises an accelerometer.

5. The wearable computing device of claim 1, wherein the HMD-tracking system comprises a gyroscope.

6. The wearable computing device of claim 1, wherein the HMD-tracking system comprises a rangefinder.

7. The wearable computing device of claim 1, wherein the HMD-tracking system comprises a proximity sensor.

8. The wearable computing device of claim 1, wherein the HMD-tracking system comprises an eye-tracking system.

9. The wearable computing device of claim 1, wherein the image area comprises an image area pixel set and the display area comprises a display area pixel set, and wherein the image area pixel set is a subset of the display area pixel set.

10. The wearable computing device of claim 9, wherein the controller is configured to adjust the image area by changing a location of the image area pixel set within the display area pixel set.

11. The wearable computing device of claim 9, wherein the controller is configured to adjust the image area by changing a size of the image area pixel set within the display area pixel set.

12. The wearable computing device of claim 1, wherein the controller is configured to adjust the image area by mechanically moving the display area.

13. The wearable computing device of claim 1, wherein the controller is configured to adjust the image area using an optical element optically coupled to the display area.

14. The wearable computing device of claim 1, wherein the controller is configured to adjust the image area using a liquid crystal lens optically coupled to the display area.

15. The wearable computing device of claim 1, wherein the controller is configured to adjust the image area by moving a tilting plate.

16. A method, comprising:
displaying images within an image area of a display area of a head-mounted display (HMD), wherein all of the image area is visible, through an optical element of the HMD, by an eye of a wearer of the HMD when the eye of the wearer is located within a first range of viewing locations;
acquiring movement data indicating movement of the HMD relative to the eye of the wearer; and
adjusting the image area within the display area based on the acquired movement data so as to increase a range of viewing locations from which the image area is visible through the optical element by the eye of the wearer to a second range of viewing locations that (i) is larger than the first range of viewing locations and (ii) includes the first range of viewing locations.

17. The method of claim 16, wherein the display area is optically coupled to a light-emitting diode (LED) display.

18. The method of claim 16, wherein the display area is optically coupled to a liquid crystal on silicon (LCOS) display.

19. The method of claim 16, wherein the movement data is acquired using an accelerometer.

20. The method of claim 16, wherein the movement data is acquired using a gyroscope.

21. The method of claim 16, wherein the movement data is acquired using a rangefinder.

22. The method of claim 16, wherein the movement data is acquired using a proximity sensor.

23. The method of claim 16, wherein the movement data is acquired using an eye-tracking system.

24. The method of claim 16, wherein the image area comprises an image area pixel set and the display area comprises a display area pixel set, and wherein the image area pixel set is a subset of the display area pixel set.

25. The method of claim 24, wherein the image area is adjusted by changing a location of the image area pixel set within the display area pixel set.

26. The method of claim 24, wherein the image area is adjusted by changing a size of the image area pixel set within the display area pixel set.

27. The method of claim 16, wherein the image area is adjusted by mechanically moving the display area.

28. The method of claim 16, wherein the image area is adjusted using an optical element optically coupled to the display area.

29. The method of claim 16, wherein the image area is adjusted using a liquid crystal lens optically coupled to the display area.

30. A non-transitory computer readable medium having stored therein instructions executable by a wearable computing device to cause the wearable computing device to perform functions, the functions comprising:
causing a head-mounted display (HMD) to display images within an image area of a display area of the HMD, wherein all of the image area is visible, through an optical element of the HMD, by an eye of a wearer of the HMD when the eye of the wearer is located within a first range of viewing locations;
acquiring movement data indicating movement of the HMD relative to the eye of the wearer; and
adjusting the image area within the display area based on the acquired movement data so as to increase a range of viewing locations from which the image area is visible through the optical element by the eye of the wearer to a second range of viewing locations that (i) is larger than the first range of viewing locations and (ii) includes the first range of viewing locations.

* * * * *